(12) United States Patent
Yang

(10) Patent No.: US 6,192,966 B1
(45) Date of Patent: Feb. 27, 2001

(54) METHOD OF PRODUCING A SUNSHADE FOR AUTOMOBILE AND THE PRODUCT THEREOF

(75) Inventor: Ming-Shun Yang, Taipei (TW)

(73) Assignee: Formosa Saint Jose Corp., Taipei (TW)

(*) Notice: Subject to any disclaimer, the term of this patent is extended or adjusted under 35 U.S.C. 154(b) by 0 days.

(21) Appl. No.: 09/417,141

(22) Filed: Oct. 12, 1999

(51) Int. Cl.[7] .................................................. B60J 1/20
(52) U.S. Cl. ............................ 160/370.23; 160/370.22; 160/84.04; 160/DIG. 2; 296/97.7; 296/97.8
(58) Field of Search ..................... 160/84.04, 370.22, 160/370.23, DIG. 2, DIG. 3; 296/97.1, 97.7, 97.8; 156/150, 344; 264/40.1, 296; 428/40.1, 159

(56) References Cited

U.S. PATENT DOCUMENTS

| | | | |
|---|---|---|---|
| 4,020,207 | * | 4/1977 | Alfter ................................ 428/159 X |
| 4,097,571 | * | 6/1978 | Cox ........................................ 264/296 |
| 4,428,030 | * | 1/1984 | Baliozian ............................... 362/18 |
| 4,727,920 | * | 3/1988 | Siegler ........................ 160/DIG. 3 X |
| 4,777,994 | * | 10/1988 | Nederveld ................... 160/370.23 X |
| 4,835,026 | * | 5/1989 | Horiki et al. ....................... 428/40.1 |
| 4,838,600 | * | 6/1989 | Wischusen ................. 160/370.23 X |
| 4,897,230 | * | 1/1990 | Gross ................................... 264/40.1 |
| 4,962,729 | * | 10/1990 | Barreto et al. ......................... 119/19 |
| 5,002,817 | * | 3/1991 | Jones .................................... 428/159 |
| 5,267,599 | * | 12/1993 | Kim ........................... 160/DIG. 3 X |
| 5,324,090 | * | 6/1994 | Lehnhoff ..................... 160/370.23 X |
| 5,618,853 | * | 4/1997 | Vonken ................................. 521/60 |
| 5,649,584 | * | 7/1997 | Leubecker ..................... 160/370.23 |
| 5,692,554 | * | 12/1997 | Huang ............................ 160/370.23 |
| 6,004,415 | * | 12/1999 | Ko ............................... 160/370.22 X |

* cited by examiner

Primary Examiner—Bruce A. Lev
(74) Attorney, Agent, or Firm—Erik M. Arnhem

(57) ABSTRACT

A sunshade for an automobile is produced by continuously feeding a resilient foamed plastic board or a composite material including a layer of such resilient foamed plastic board into an oven to heat and soften the material therein, the softened foamed plastic board or composite material is then fed into a molding press. The molding press is provided with a set of molding dies that are maintained at a controlled low temperature by cooling water supplied via pipes extended to the molding press, so that the resilient foamed plastic board or the composite material is pressed, cooled, and molded at a time to form a plurality of continuous primary sunshades. The continuous primary sunshades are cut apart and trimmed to provide finished products of individual sunshades. The completed sunshade each is provided at a surface with parallelly and alternately arranged wider and narrower folding grooves. The wider folding groove has a width twice as large as that of the narrower folding groove, enabling the sunshade to be smoothly and fitly folded into a small volume for convenient storage without creating cracks that would adversely affect the appearance and the usable life of the sunshade.

9 Claims, 9 Drawing Sheets

METHOD OF PRODUCING A SUNSHADE FOR AUTOMOBILE AND THE PRODUCT THEREOF

BACKGROUND OF THE INVENTION

The interior of an automobile is an almost closed space that becomes very hot and sweltering when sun light projects into it for a prolonged time. An in-car air-conditioning system might be useful in cooling the interior of the automobile. It cannot, however, stop the sun light from projecting into the automobile. There are various kinds of sunshades for automobiles available in the markets. A user may fix the sunshade to inner side of the windshield in order to prevent the sun light from directly projecting into the automobile. The sunshade has therefore become a necessary article in automobiles. Although these commercially available sunshades are differently structured and manufactured, they have a common disadvantage that they are manufactured in several separated stages instead of being produced on a continuous production line. As a result, the conventional sunshades suffer from an efficient production process. Moreover, these conventional sunshades are made of different materials and accordingly are different in their quality. A sunshade made of inferior material tends to deform and have a shortened usable life when the sunshade is subject to frequent folding or compressing. A deformed sunshade is unsightly and cannot be easily folded for convenient storage.

It is therefore desirable to develop a sunshade for use in an automobile to eliminate the drawbacks existing in the currently available sunshades.

SUMMARY OF THE INVENTION

A primary object of the present invention is to provide a method for producing a sunshade for use in an automobile. The method includes continuous and consistent steps and therefore increases the efficiency in producing the sunshade.

Another object of the present invention is to provide a method for producing a sunshade which enables production of integrally molded sunshades for automobiles.

A further object of the present invention is to provide a sunshade that can be smoothly folded to a reduced volume without creating undesirable cracks that will shorten the usable life of the sunshade.

The method of the present invention for producing a sunshade for automobile includes the step of continuously feeding a resilient foamed plastic board or a composite material including a layer of such resilient foamed plastic board into an oven to heat the same in said oven, so that the resilient foamed plastic board becomes softened before the foamed plastic board or the composite material is fed into a molding press. The molding press is provided with a set of molding dies that are maintained at a controlled low temperature by cooling water supplied via pipes extended through the molding press, so that the resilient foamed plastic board or the composite material is pressed, cooled, and molded at a time to form a plurality of continuous primary sunshades. The continuous primary sunshades are cut apart and trimmed to provide finished individual sunshades. Each completed sunshade is provided at a surface with parallel and alternately arranged wider and narrower folding grooves. The wider folding groove has a width twice as large as that of the narrower folding groove, enabling the sunshade to be smoothly folded into a small volume for convenient storage without creating cracks that would adversely affect the appearance and the usable life of the sunshade.

DETAILED DESCRIPTION OF THE PREFERRED EMBODIMENTS

Figure 1:
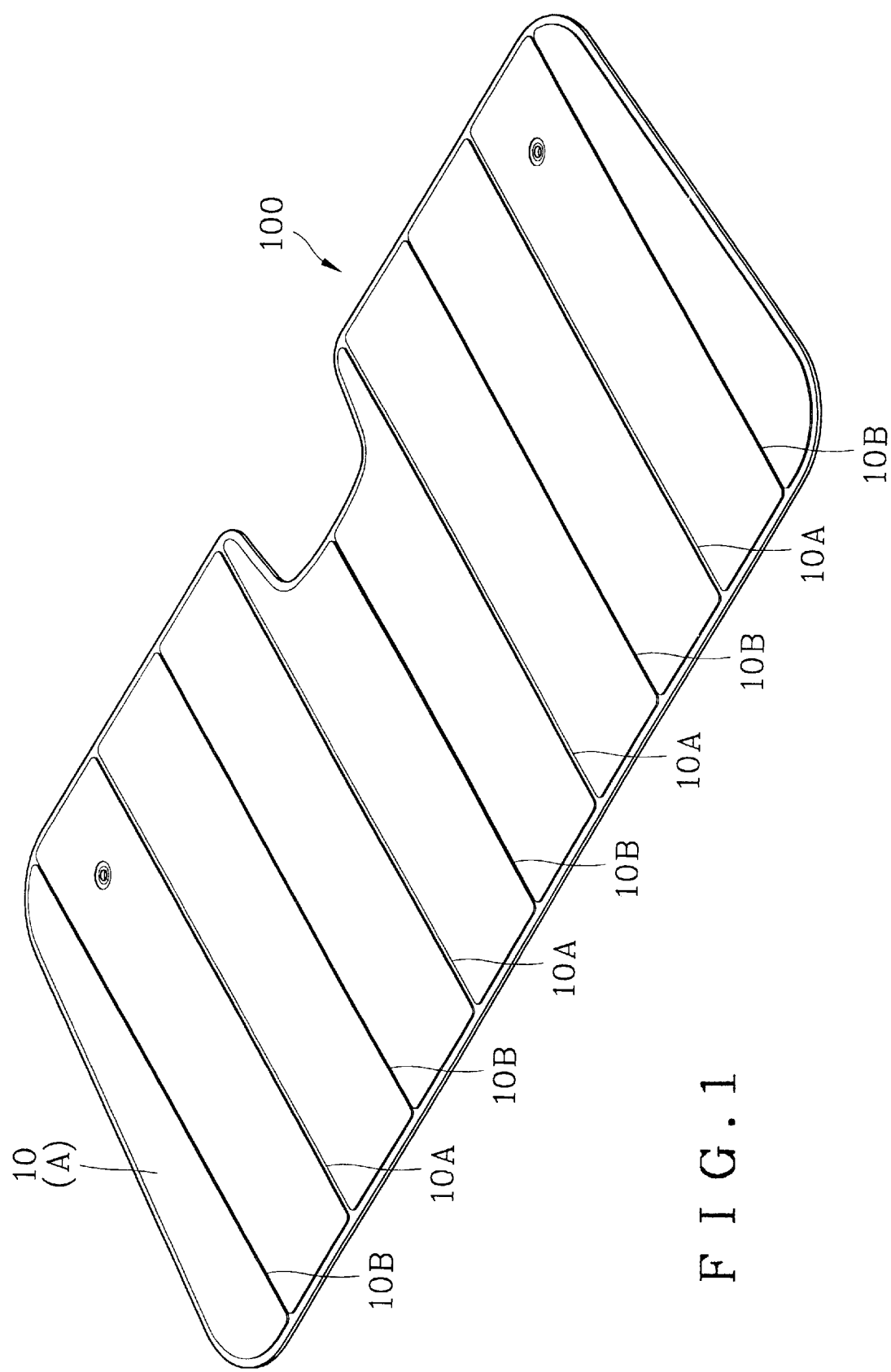
FIG. 1 is a perspective of a sunshade made according to the method of the present invention for use in an automobile.

Please refer to FIG. 1 in which a sunshade (100) made according to the method of the present invention for use in an automobile is shown. In a first embodiment of the present invention, the sunshade (100) is made of a resilient foamed plastic board (10) having an initial thickness within the range from 3 mm to 5 mm. Typically, the resilient foamed plastic board (10) is formed from a resilient foamed plastic material having average random closed bubble cells, such as the vulcanized cross linking polyethylene foam and EVA, that is, ethylene vinyl acetate copolymer.

Figure 2:
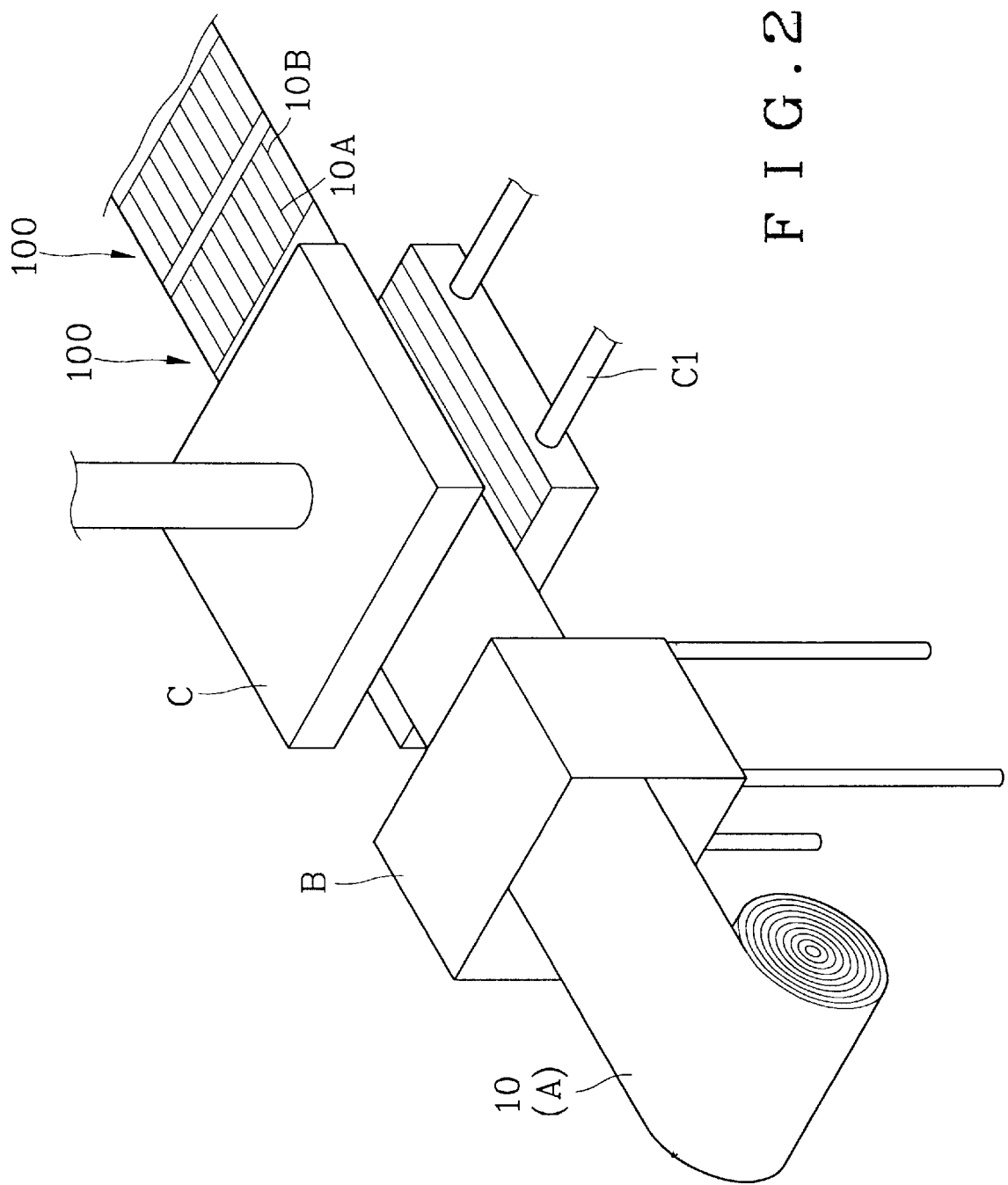
FIG. 2 is a fragmentary perspective showing the production line for producing the sunshade according to the present invention.
Figure 3:
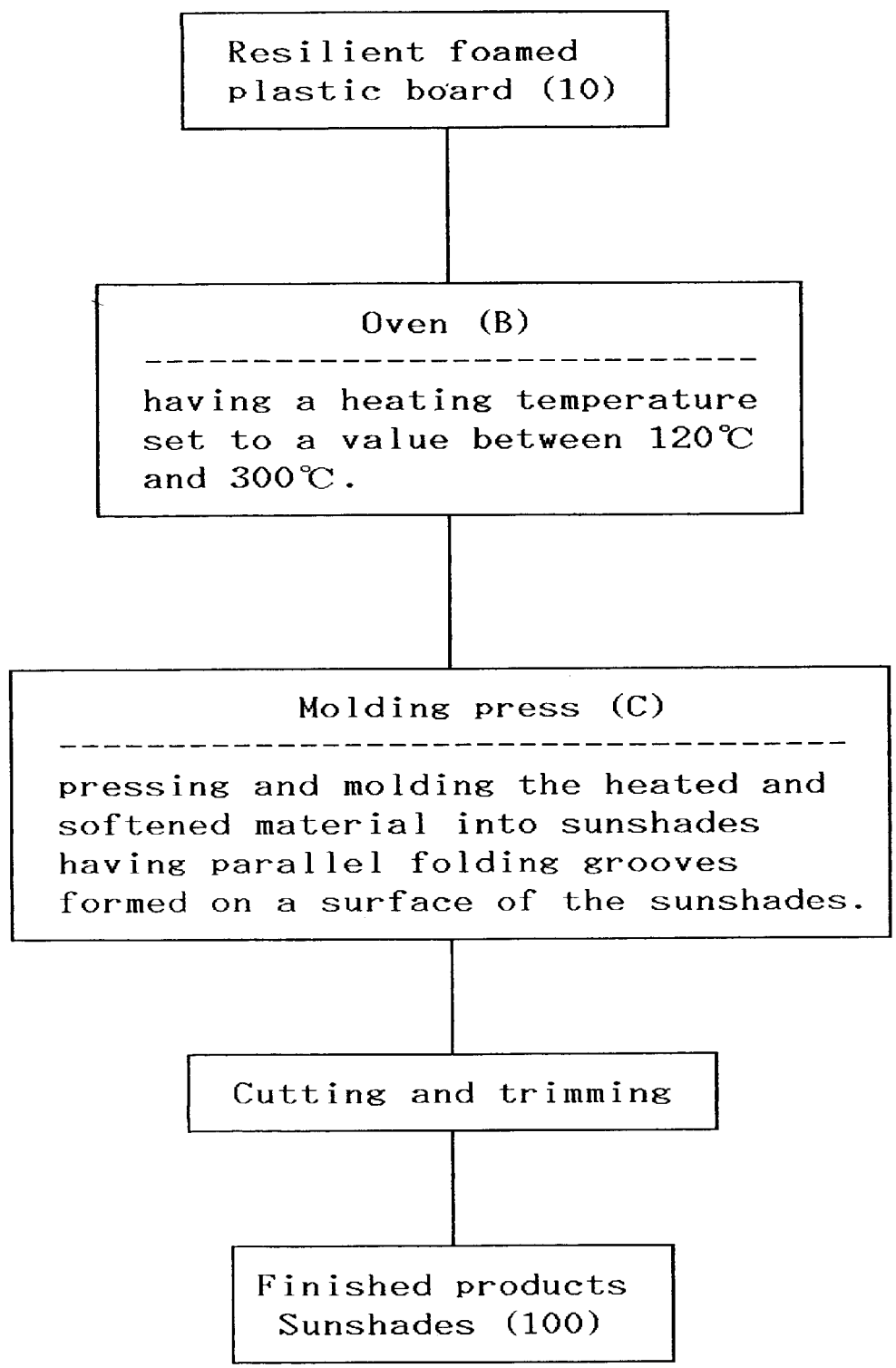
FIG. 3 is a flowchart of the process of producing the sunshade according to a first embodiment of the present invention.

FIG. 2 is a fragmentary perspective showing the machinery included in a production line for producing the sunshade (100), and FIG. 3 is a flowchart of the process for producing the sunshade (100) according to the first embodiment of the present invention.

In this first embodiment, the sunshade (100) is made by continuously feeding the resilient foamed plastic board (10) from a supply roll into an oven (B) in which the foamed plastic board (10) is heated. The oven (B) has an internal temperature set to a value between 120° C. and 300° C., so that the resilient foamed plastic board (10) passing through the oven (B) is softened from an originally somewhat stiff state. Meanwhile, the average random closed bubble cells inside the softened material of the foamed plastic board (10) are caused by the heat to expand for a second time, so that the heated and softened resilient foamed plastic board (10) is well prepared for being integrally pressed and molded when the board (10) is sent through a molding press (C) provided with a set of dies.

The set of dies provided on the molding press (C) are maintained at a controlled low temperature by cooling water supplied to the molding press (C) through cooling water pipes (C1), so that the softened foamed plastic board (10) passing through the molding press (C) is pressed, cooled, and molded at a time to form continuous primary sunshades. The continuous primary sunshades are then cut apart and trimmed, so that a plurality of individual sunshades (100) as shown in FIG. 1 are produced.

Figure 4:
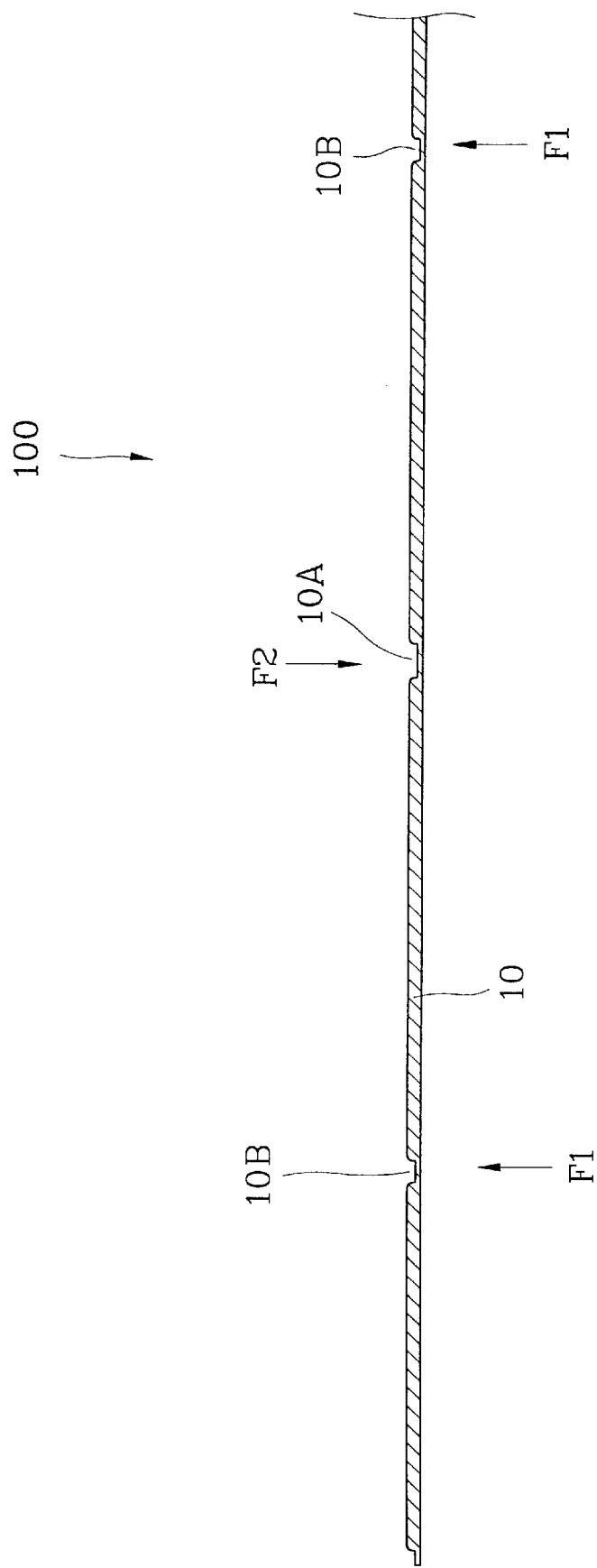
FIG. 4 is a fragmentary sectional view of the sunshade according to the first embodiment of the present invention made of a resilient foamed plastic board.

As can be seen from FIGS. 1 and 4, each sunshade (100) produced according to the above steps is provided on a surface thereof with a plurality of parallel folding grooves (10A) and (10B) preferably extended between two longer edge of the sunshade (100). It is to be noted that each folding groove (10A) has a width about twice as large as that of the folding groove (10B), and that folding grooves (10A) and (10B) are alternately arranged on the surface of the sunshade (100).

Figure 5:
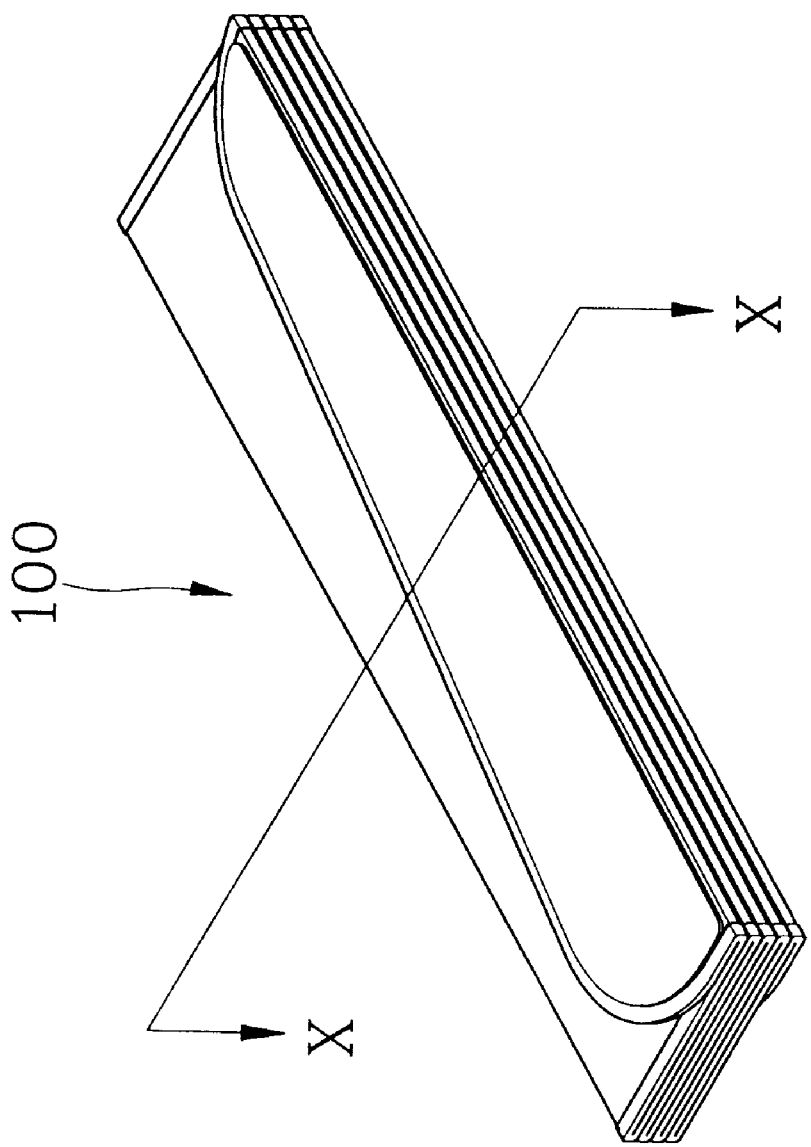
FIG. 5 is a perspective of the sunshade of FIG. 1 in a fully folded state.
Figure 6:
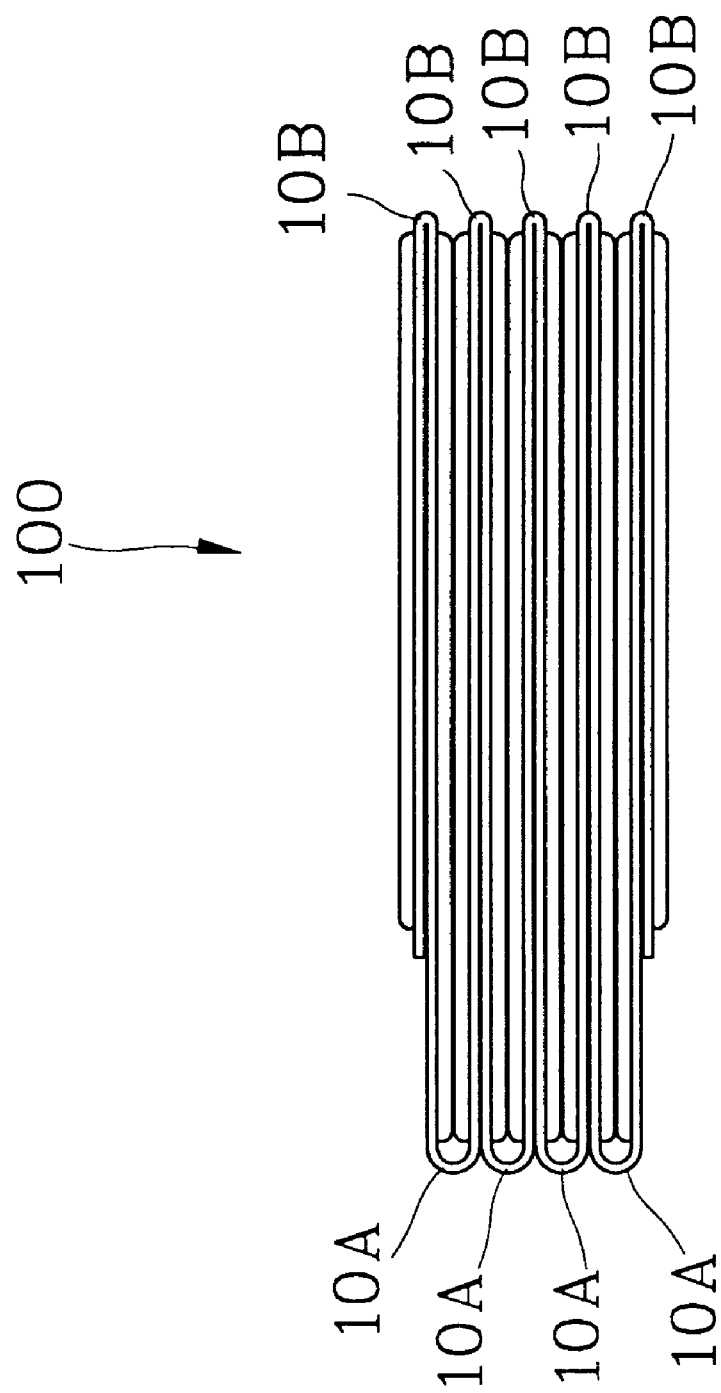
FIG. 6 is a sectional view taken on line X—X of FIG. 5.

Please refer to FIGS. 4, 5 and 6. When a user intends to fold the sunshade (100) into reduced dimensions, he or she may apply a force (F2) on a front side of any one of the folding grooves (10A) to cause the sunshade (100) to inward fold along the folding groove (10A), and then apply forces (F1) separately on backside of two folding grooves (10B) directly at two sides of the previously folded folding groove (10A), so that the sunshade (100) is outward folded along the two folding grooves (10B). The width of the folding groove (10A) is so selected that, when the sunshade (100) is inward folded along the folding groove (10A), two surfaces on the sunshade (100) facing each other are allowed to smoothly contact each other without being undesirably compressed. Similarly, the width of the folding groove (10B) allows two surfaces on the folded sunshade (100) facing away from each other to smoothly and contact each other at their backside without being undesirably compressed. The sunshade (100) folded in the above-described manner has reduced volume that facilitates convenient storage of the sunshade (100) when it is not in use. The smooth folding action prevents the sunshade (100) from undesirable cracks and accordingly ensures a pleasant appearance and extended usable life of the sunshade (100).

Figure 7:
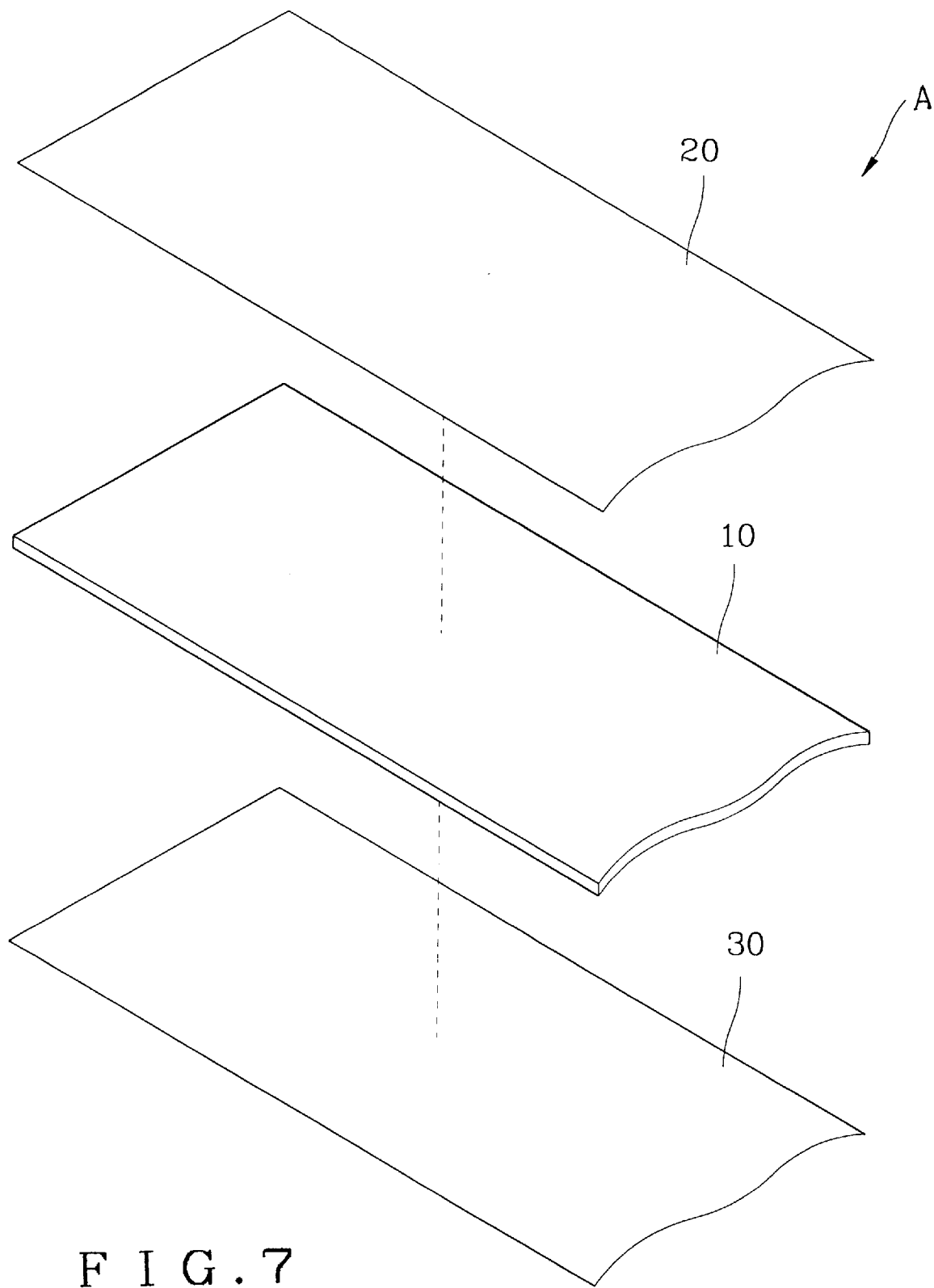
FIG. 7 is an exploded perspective showing the structure of a composite material for making the sunshade according to a second embodiment of the present invention.
Figure 8:
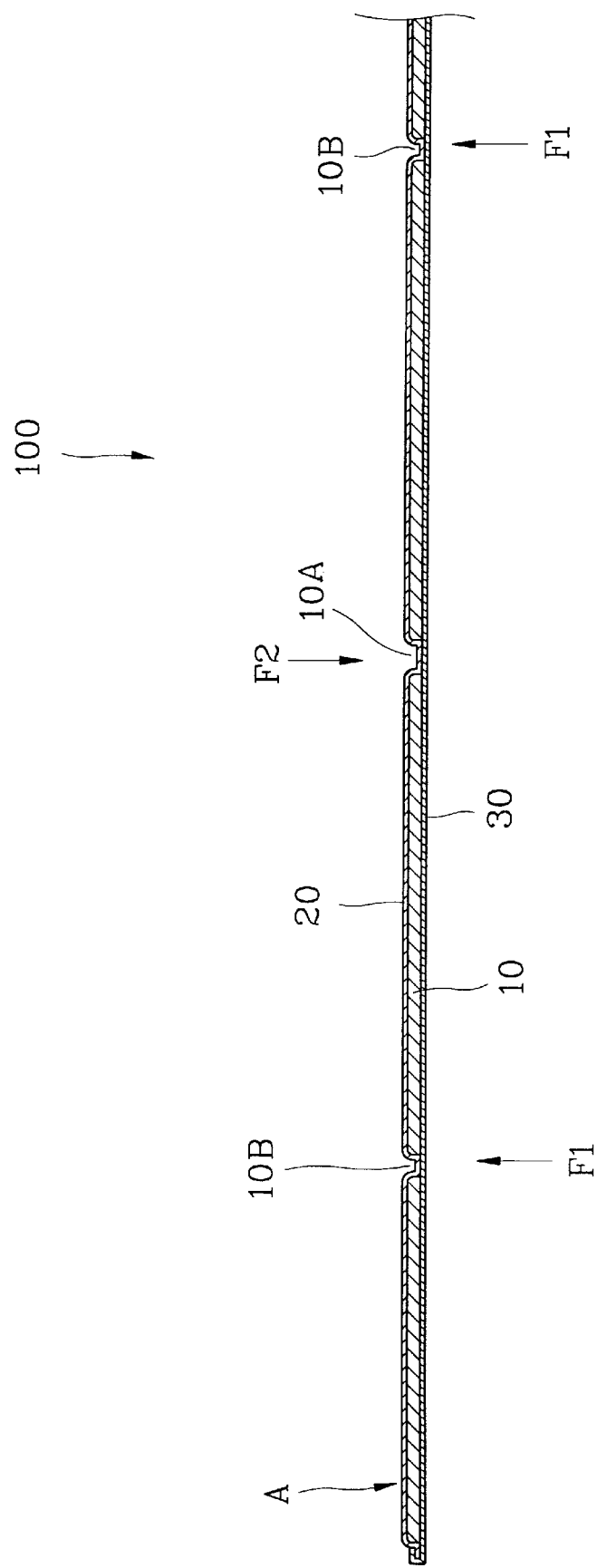
FIG. 8 is a fragmentary sectional view of the sunshade according to the second embodiment of the present invention made of the composite material of FIG. 7.

In a second embodiment of the present invention, the sunshade (100) is produced from a composite material (A). As shown in FIG. 7, the composite material (A) mainly includes a middle layer that is a resilient foamed plastic board (10), a surface layer (20) that may be a plastic sheet or a textile fabric, and a bottom layer (30) that may be a plastic sheet or a textile fabric, too. The middle layer of resilient foamed plastic board (10), like the one used in the first embodiment, is formed from a resilient foamed plastic material having average random closed bubble cells, such as the vulcanized cross linking polyethylene foam and EVA.

Figure 9:
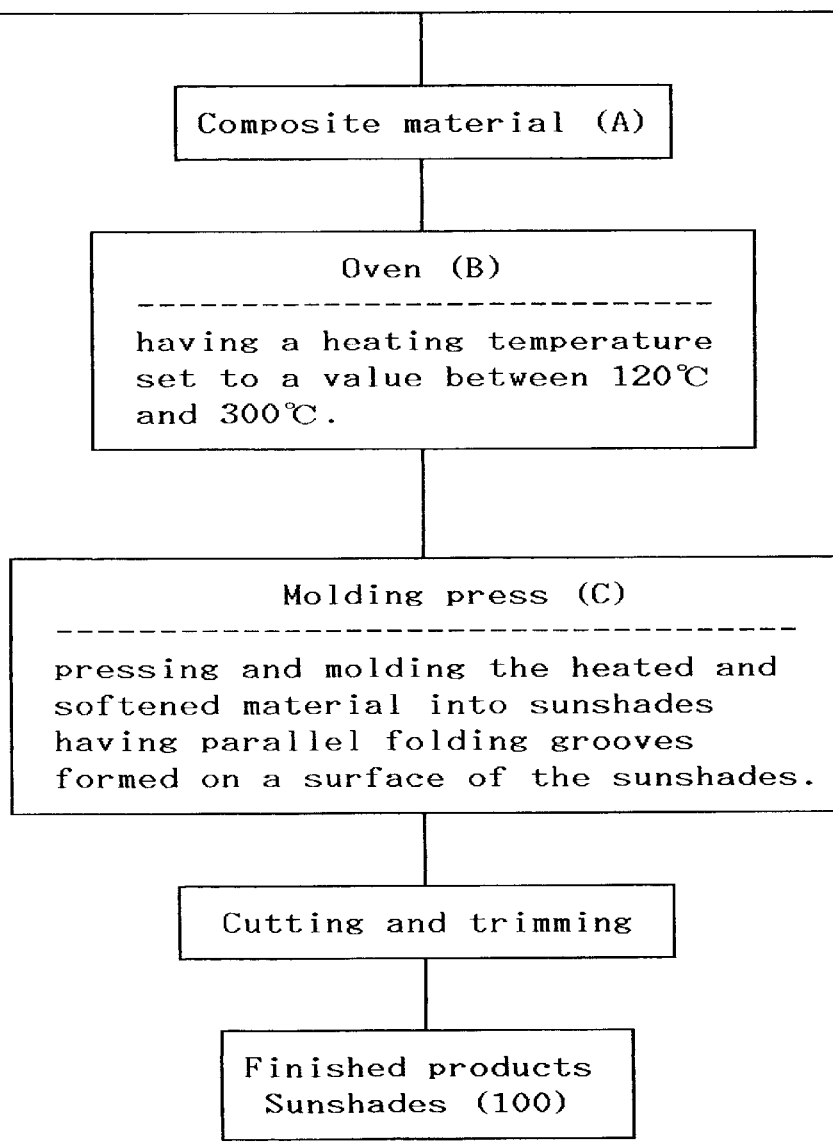
FIG. 9 is a flowchart of the process of producing the sunshade according to the second embodiment of the present invention.

The machinery shown in FIG. 2 may also be used to produce the sunshade (100) according to the second embodiment of the present invention. FIG. 9 is a flowchart of the process for producing the sunshade (100) according to the second embodiment of the present invention.

To produce the sunshade (100) according to the second embodiment of the present invention, the composite material is first prepared and pre-treated by applying heat-resistant bonding agent to a bottom side of the surface layer (20) of plastic sheet or textile fabric and to an upper side of the bottom layer (30) of plastic sheet or textile fabric, so that the middle layer of resilient foamed plastic board (10) can be bonded to and sandwiched between the surface layer (20) and the bottom layer (30) to form the three-layered composite material (A). As shown in FIG. 2, the composite material (A) in the supply roll is continuously fed into the oven (B) in which the composite material (A) is heated. Again, the oven (B) has an internal temperature set to a value between 120° C. and 300° C., so that the middle layer of resilient foamed plastic board (10) of the composite material (A) passing through the oven (B) is heated and softened from an originally somewhat stiff state. Meanwhile, the average random closed bubble cells inside the softened material of the foamed plastic board (10) are caused by the heat to expand for a second time, so that the heated and softened composite material (A) is well prepared for being integrally pressed and molded when the composite material (A) is sent through the molding press (C) provided with a set of dies.

The set of dies provided on the molding press (C) are maintained at a controlled low temperature by cooling water supplied to the molding press (C) through cooling water pipes (C1), so that the softened composite material (A) passing through the molding press (C) is pressed, cooled, and molded at a time to form continuous primary sunshades. The continuous primary sunshades are then cut apart and trimmed, so that a plurality of individual sunshades (100) as shown in FIG. 1 are produced.

It is understood that the composite material (A) is not necessarily limited to include three layers. A composite material (A) including only two layers is also acceptable for the purpose of the present invention. In this case, a layer of plastic sheet or textile fabric (20) and a layer of resilient foamed plastic board (10) are used to form the composite material (A) in the same manner as described above.

The sunshade (100) produced from the composite material (A) is provided on a surface thereof with a plurality of parallel and alternately arranged wider and narrower folding grooves (10A) and (10B), respectively. Again, each folding groove (10A) has a width twice as large as that of the folding groove (10B). The structure and effect of the folding grooves (10A) and (10B) all are similar to that formed in the first embodiment of the sunshade (100) of the present invention, and are therefore not repeated again.

Although the sunshade (100) produced according to the method of the present invention is simple in its production manner and its structure, the material selected and the continuous production line designed for making the sunshade (100) together enable the sunshade (100) to have better insulating properties and easier storage capabilities without decreasing its beauty and usable life. Therefore, the sunshade of the present invention and the method for producing it are industrially practical.

What is claimed is:

1. A method of producing an automobile sunshade, comprising the following steps:
   (a) continuously feeding a closed-cell foamed plastic board through an oven to heat said board to a condition wherein the plastic material is softened and the foam cells are expanded;
   (b) moving said heated plastic board from said oven through a set of molding dies so that the plastic board is pressed and molded repetitively, to form a continuous train of individual sunshades;
   (c) continuously cooling the molding dies by passing liquid coolant through said dies, whereby the heated plastic board is cooled during the molding operation; and
   (d) cutting the molded board at selected areas thereof to separate the sunshades formed as a result of steps (b) and (c).

2. The method of claim 1, wherein said closed cell foamed plastic board has two major surfaces, and a fabric sheet laminated to one of said surfaces.

3. The method of claim 1, wherein said closed-cell foamed plastic board has two major surfaces, and plastic sheet laminated to one of said surfaces.

4. The method of claim 1, wherein the closed-cell foamed plastic board has a thickness within the range from three mm. to five mm.

5. The method of claim 1, wherein the closed-cell foamed plastic board is selected from a group of materials consisting of vulcanized cross linking polyethylene and ethylene vinyl acetate copolymer.

6. The method of claim 1, wherein the oven has an internal temperature in the range from 120 C to 300 C.

7. The method of claim 1, wherein molding step (b) includes embossing a series of parallel fold grooves in each individual sunshade.

8. The method of claim 7, wherein molding step (b) is carried out so that adjacent grooves in each individual sunshade are of different widths, whereby the separated sunshades can be folded in zig-zag fashion.

9. The method of claim 1, wherein the plastic board used in step (a) is a composite laminated board that comprises a core layer formed of a closed-cell foamed plastic material and two surface layers bonded to the major surfaces of said core layer.

* * * * *